United States Patent
Kolar et al.

(10) Patent No.: US 12,381,774 B2
(45) Date of Patent: Aug. 5, 2025

(54) APPLICATION DEGRADATION ROOT CAUSING AND REROUTING USING TIME SERIES CLUSTERING

(71) Applicant: Cisco Technology, Inc., San Jose, CA (US)

(72) Inventors: Vinay Kumar Kolar, San Jose, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/691,432

(22) Filed: Mar. 10, 2022

(65) Prior Publication Data
US 2023/0291636 A1    Sep. 14, 2023

(51) Int. Cl.
- *H04L 41/0631* (2022.01)
- *H04L 41/16* (2022.01)
- *H04L 41/5067* (2022.01)
- *H04L 45/00* (2022.01)

(52) U.S. Cl.
CPC ............ *H04L 41/065* (2013.01); *H04L 41/16* (2013.01); *H04L 41/5067* (2013.01); *H04L 45/46* (2013.01)

(58) Field of Classification Search
CPC ... H04L 41/065; H04L 41/16; H04L 41/5067; H04L 45/46
See application file for complete search history.

(56) References Cited

U.S. PATENT DOCUMENTS

| | | | |
|---|---|---|---|
| 8,001,527 B1 | 8/2011 | Waheed et al. | |
| 10,027,530 B2 | 7/2018 | Mahkonen et al. | |
| 10,511,690 B1 * | 12/2019 | Chatterjee | H04L 43/16 |
| 10,708,122 B1 * | 7/2020 | Liu | H04L 41/5009 |
| 10,791,168 B1 * | 9/2020 | Dilley | H04L 67/288 |
| 10,880,186 B2 | 12/2020 | Kumaran et al. | |

(Continued)

FOREIGN PATENT DOCUMENTS

WO    2020/177854    9/2020

OTHER PUBLICATIONS

Spacagna, Gianmario, "Manifold clustering in the embedding space using UMAP and GMM", online: https://towardsdatascience.com/manifold-clustering-in-the-embedding-space-using-umap-and-gmm-dbab26a9efba, Jan. 2, 2021, accessed Mar. 3, 2022.

*Primary Examiner* — John A Follansbee
*Assistant Examiner* — Zonghua Du
(74) *Attorney, Agent, or Firm* — Behmke Innovation Group LLC; James M. Behmke

(57) ABSTRACT

In one embodiment, a device forms clusters of network paths via which traffic for an online application is conveyed by applying clustering to time series of quality of experience metrics for the online application. The device calculates, for a particular cluster of network paths among the clusters of network paths, correlation metrics between path features of those network paths of that cluster. The device selects, based on the correlation metrics, a particular path feature from among the path features as a root cause of poor quality of experience metrics for the online application along the network paths of the particular cluster of network paths. The device provides, to a user interface, an indication of the particular path feature as being the root cause of poor quality of experience metrics for the online application.

14 Claims, 16 Drawing Sheets

(56) References Cited

U.S. PATENT DOCUMENTS

| | | | |
|---|---|---|---|
| 2015/0033084 A1* | 1/2015 | Sasturkar | H04L 41/22 |
| | | | 714/46 |
| 2019/0155672 A1* | 5/2019 | Wang | G06F 11/079 |
| 2019/0335351 A1* | 10/2019 | Hui | H04W 24/08 |
| 2020/0029240 A1* | 1/2020 | Li | H04L 41/5067 |
| 2020/0162341 A1* | 5/2020 | Vasseur | G06N 3/045 |
| 2020/0210393 A1* | 7/2020 | Beaver | G06F 16/2474 |
| 2020/0267057 A1* | 8/2020 | Garvey | H04L 41/0886 |
| 2020/0382402 A1* | 12/2020 | Kolar | H04L 43/20 |
| 2020/0409339 A1* | 12/2020 | Arashanipalai | G06F 16/906 |
| 2021/0211347 A1 | 7/2021 | Vasseur et al. | |
| 2021/0258652 A1* | 8/2021 | Li | H04L 41/0686 |
| 2023/0069074 A1* | 3/2023 | Chen | G06F 11/3447 |

\* cited by examiner

APPLICATION DEGRADATION ROOT CAUSING AND REROUTING USING TIME SERIES CLUSTERING

TECHNICAL FIELD

The present disclosure relates generally to computer networks, and, more particularly, to application degradation root causing and rerouting using time series clustering.

BACKGROUND

Software as a service (SaaS) applications are often deployed across multiple servers and geographic regions, to provide best connectivity to the clients who connect to the application. These applications are automatically scaled out into various servers on data centers across the world.

Detecting and root causing application degradation or failures over networks is vital to troubleshoot and provide good application user experience in large networks. However, in a large network, application degradation occurs numerous times over multiple paths. Such degradation can happen due to multiple causes such as memory or CPU issues at an edge router, problems at the data center, congestion at site-level routers, or even due to some Service Provider (SP) or Autonomous System (AS) issues. In a network with thousands of routers and paths, it is overwhelming for the network administrator to look at each application failure for multiple applications, and then narrow down the possible root cause(s) of the application degradation.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
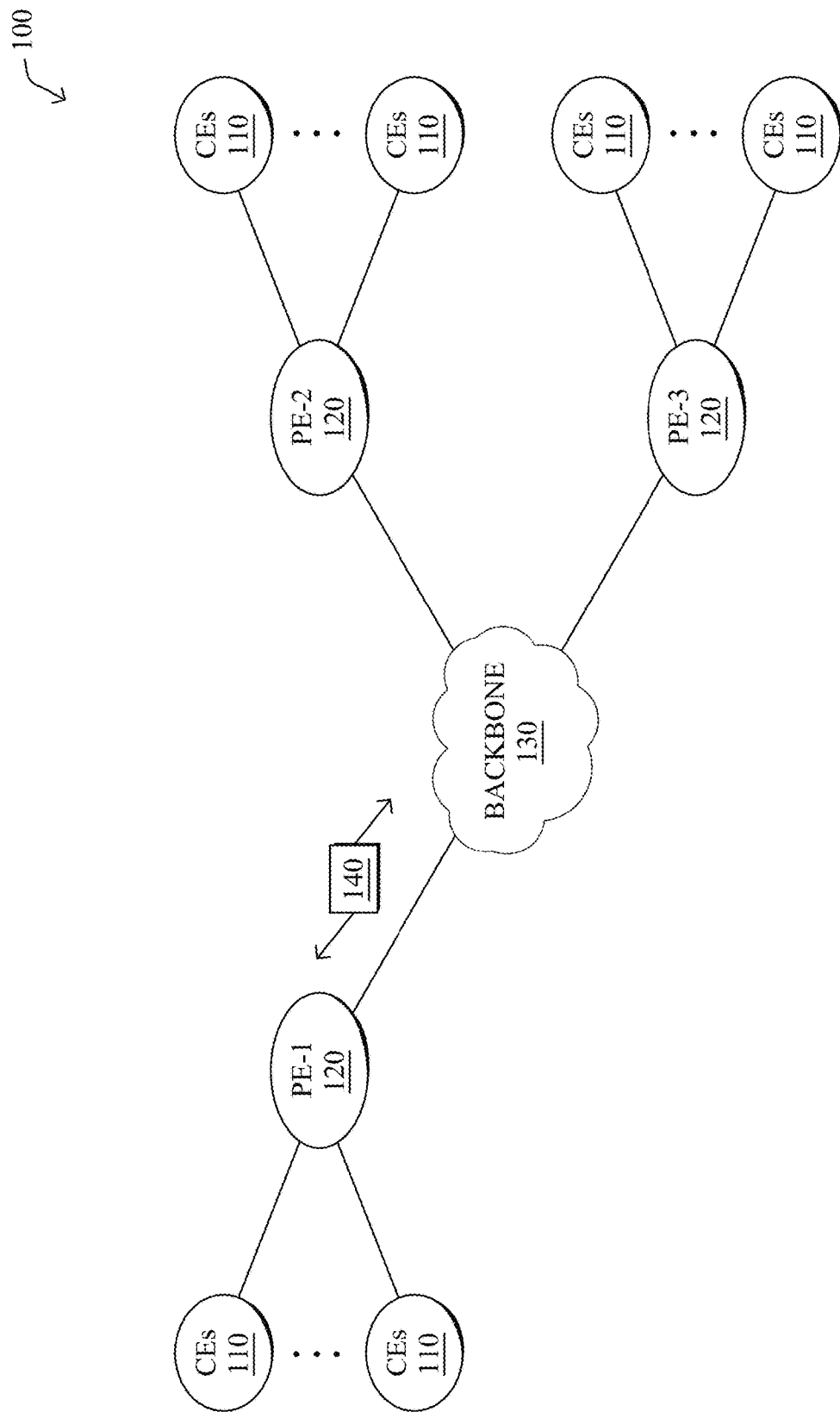
FIGS. 1A-1B illustrate an example communication network.

According to one or more embodiments of the disclosure, a device forms clusters of network paths via which traffic for an online application is conveyed by applying clustering to time series of quality of experience metrics for the online application. The device calculates, for a particular cluster of network paths among the clusters of network paths, correlation metrics between path features of those network paths of that cluster. The device selects, based on the correlation metrics, a particular path feature from among the path features as a root cause of poor quality of experience metrics for the online application along the network paths of the particular cluster of network paths. The device provides, to a user interface, an indication of the particular path feature as being the root cause of poor quality of experience metrics for the online application.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
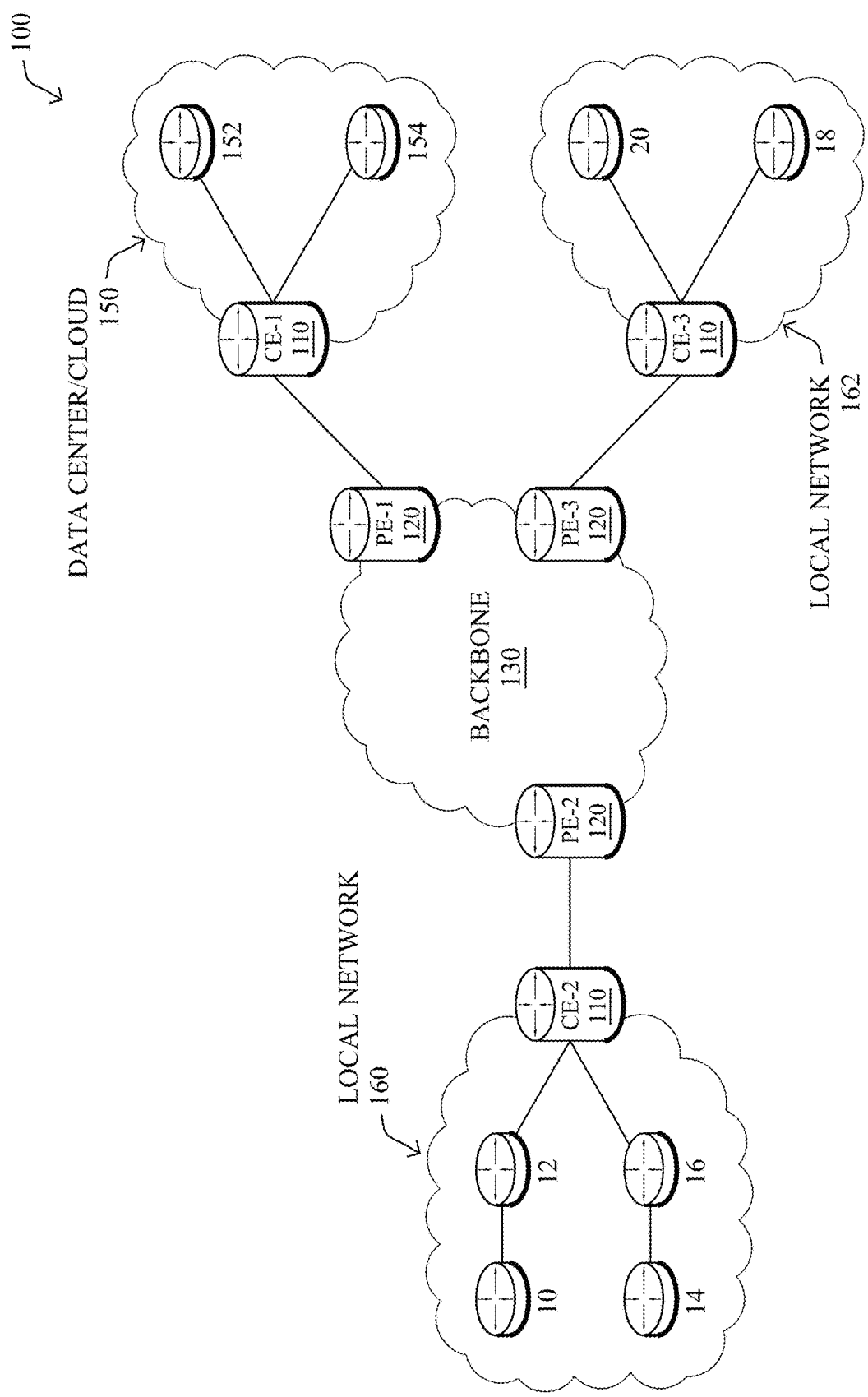

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
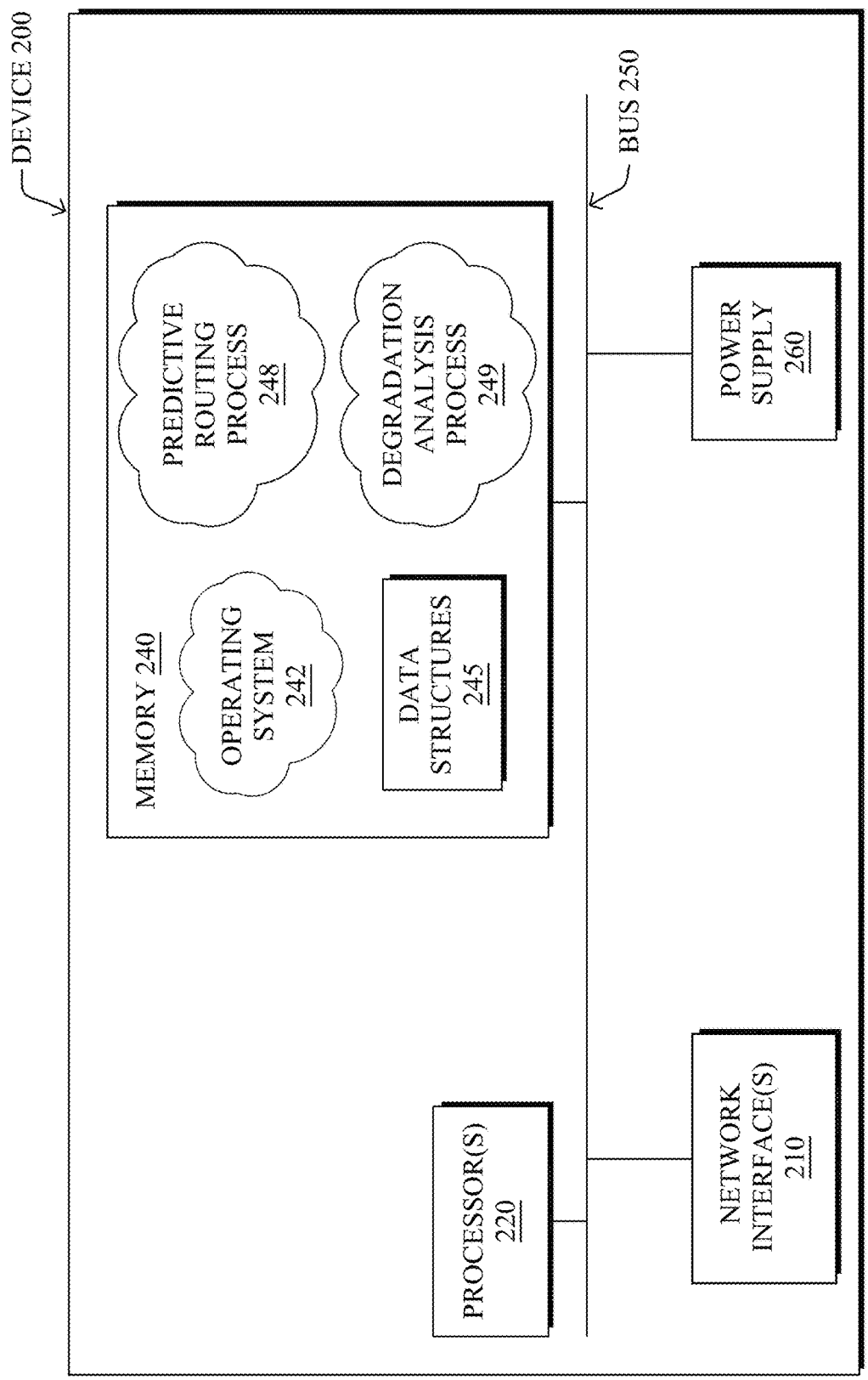
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a degradation analysis process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 and/or a degradation analysis process 249 may include computer executable instructions that, when executed by processor(s) 220, cause device 200 to perform the techniques described herein. To do so, in some embodiments, predictive routing process 248 and/or a degradation analysis process 249 may utilize machine learning. In general, machine learning is concerned with the design and the development of techniques that take as input empirical data (such as network statistics and performance indicators), and recognize complex patterns in these data.

One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or a degradation analysis process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or a degradation analysis process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
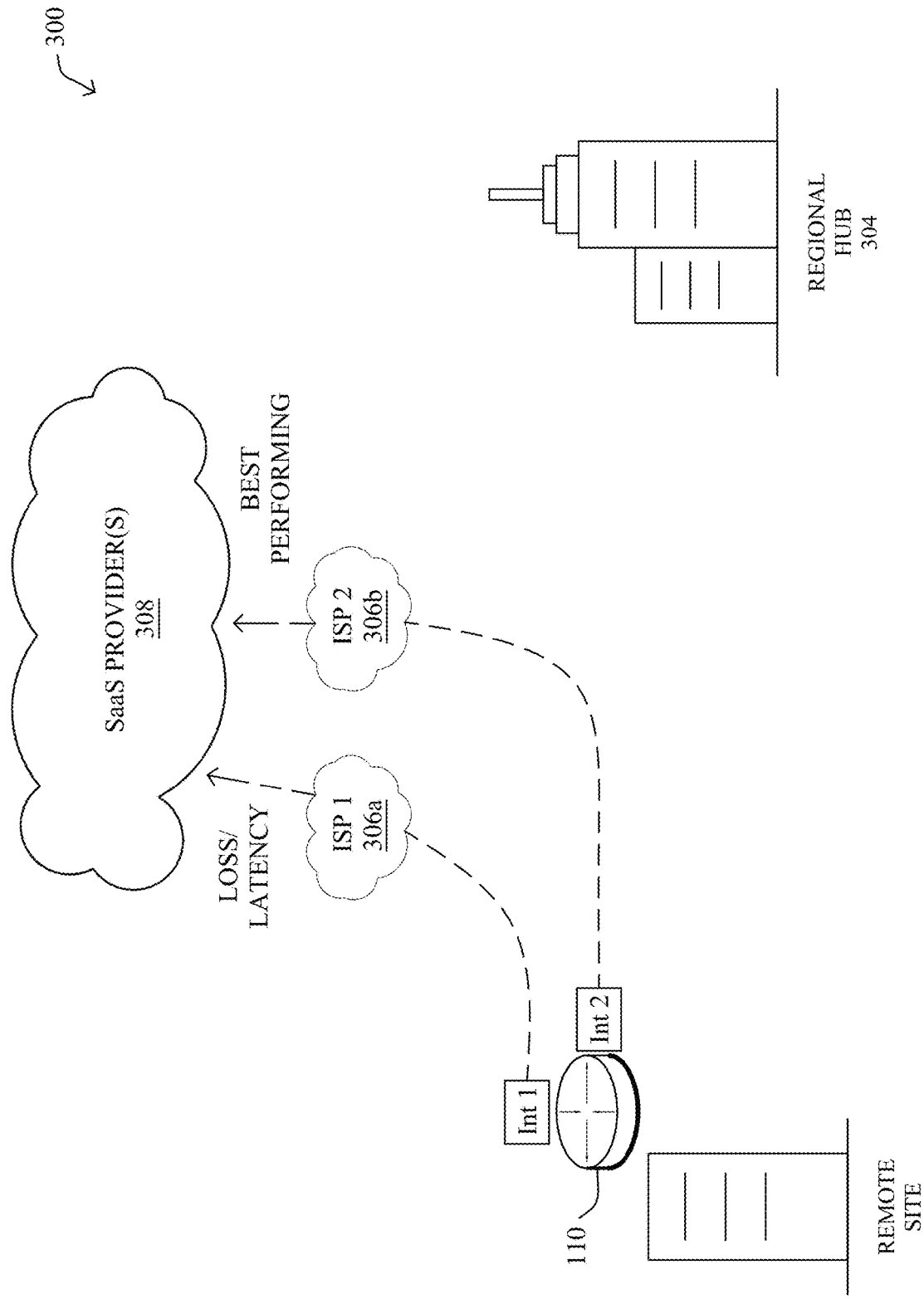
FIGS. 3A-3B illustrate example network deployments.
Figure 3B:
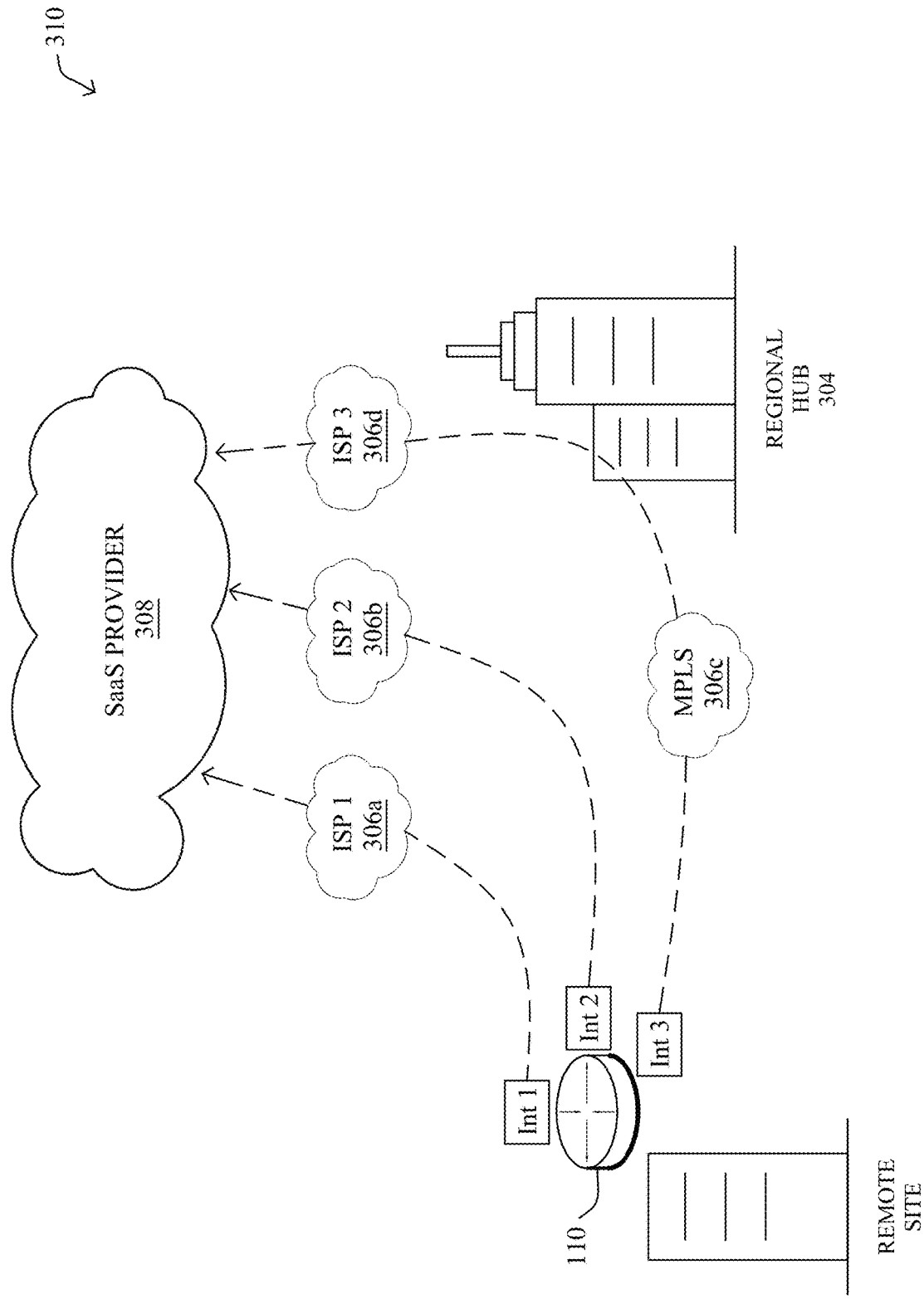

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
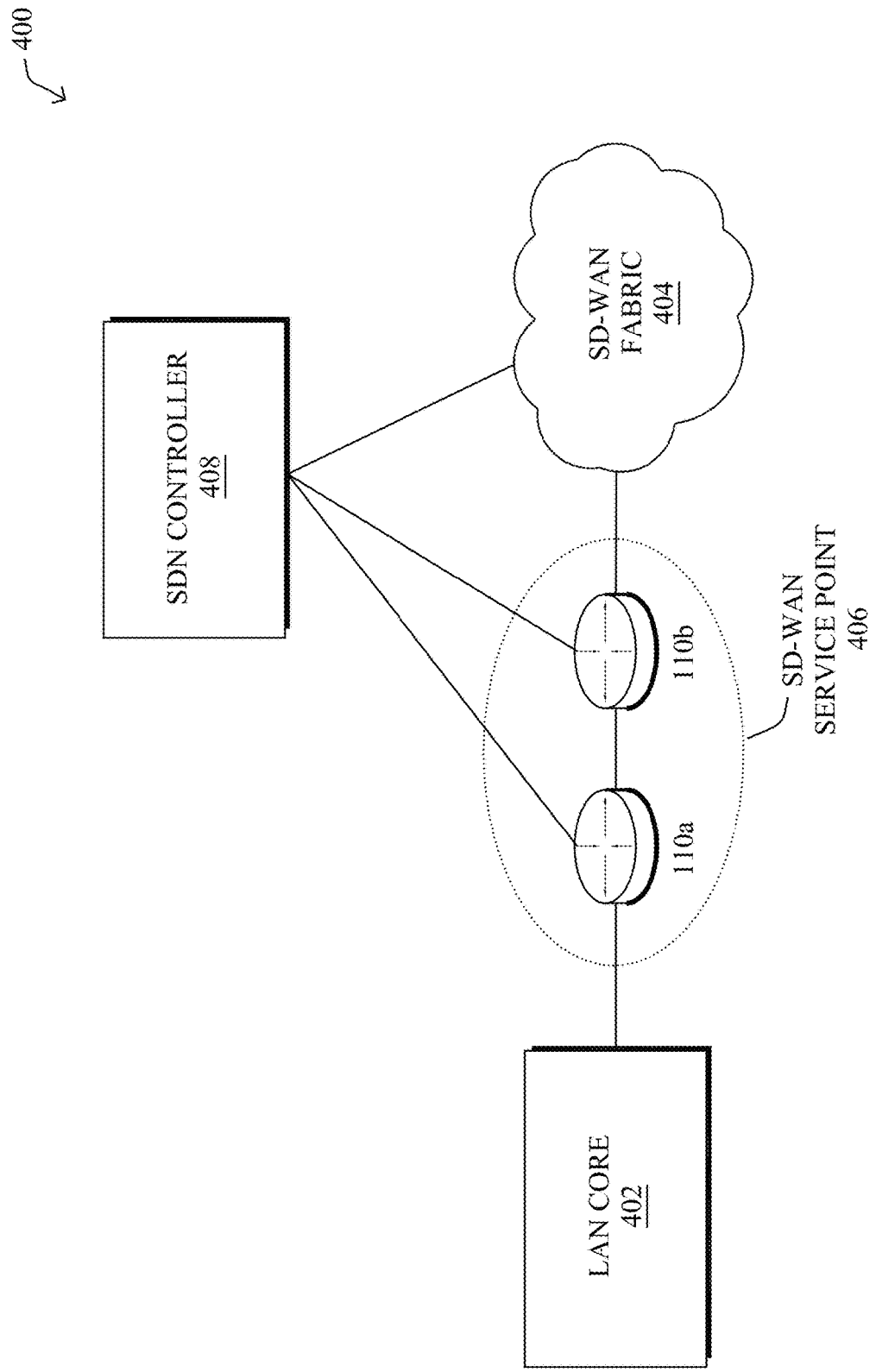
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

A primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;

Internet, MPLS. LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS, OSPE, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (IMP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
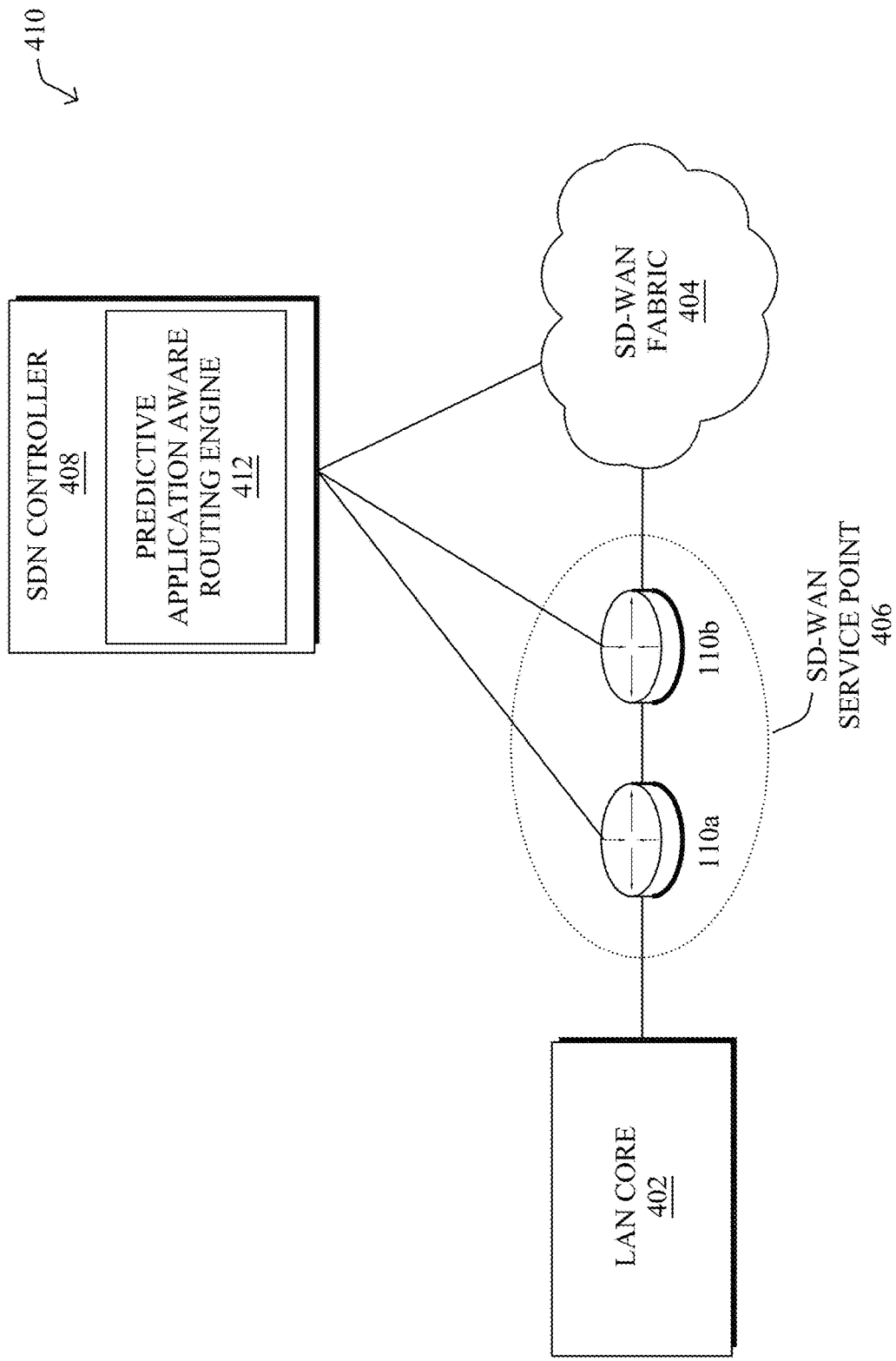

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As would be appreciated, modern SaaS applications are typically delivered globally via public cloud infrastructure using cloud native services. Even though public cloud providers may have a high number of points of presence (Pot's) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global because of its use of globally-available CloudFront PCPs, etc.), in reality it might run in a single region/location and user experience might vary greatly based on the location.

To determine the QoE for a particular SaaS application, various approaches are possible such as:

Obtaining user feedback directly from the application

Applying traffic analytics, such as by analyzing Netflow records that include extra metrics like Application Response Time (ART)

Sending synthetic path probes to measure networking metrics to each SaaS application from each location. These probes are 'synthetic' in that they seek to mimic the actual characteristics of the traffic of the application under scrutiny.

The first approach above is rarely used today because of its complexity. In addition, relying on direct user feedback to drive routing decisions also requires supporting application programming interfaces (APIs) and the relevant network telemetry, in order to optimize the routing. The second and third approaches above are well-suited for use in Secure Access Service Edge (SASE)/SD-WAN implementations.

In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

As noted above, detecting and root causing the degradation of the quality of experience of an online application due to network failures is vital to troubleshooting and providing good user experience in large networks. Indeed, even in predictive systems that are able to predict application degradation or failures (e.g., SLA failures, QoE below a given threshold, etc.), such as predictive application aware routing engine 412, there may be little to no insight as to the root causes of these failures.

In a large network, application degradation may occur numerous times over multiple paths. Such degradation can happen due to various causes such as memory or CPU issues at a networking device (e.g., an edge router), problems at the datacenter, congestion at site-level routers, or even due to some Service Provider (SP), Autonomous System (AS), or point of presence (POP) issues. A naïve approach to determining the root cause of the application degradation would be to find the root cause for each instance of degradation. However, this is not feasible in networks with thousands of routers and paths.

Application Degradation Root Causing and Rerouting Using Time Series Clustering

The techniques herein introduce system and methods to detect common patterns of application degradation using statistical and/or machine learning methods such as time series clustering. In some aspects, the clusters can be enhanced by expert input via a user interface. In further aspects, once a set of paths that exhibit similar patterns of application failures are identified, the techniques herein further introduce learning methods to identify and rank the correlated features and root causes between the set of paths behaving in a similar pattern. These ranked correlations and causes may also be shown to the user for taking further actions to avoid application degradation (e.g., to increase bandwidth or memory of a router, to renegotiate with the Service Provider, etc.). In yet another aspect, based on the root causes, the techniques herein can also be used to proposes recommendations for routing application traffic on alternate routes, which can be applied by the user or automatically.

Illustratively, the techniques described herein may be performed by hardware, software, and/or firmware, such as in accordance with degradation analysis process 249, which may include computer executable instructions executed by the processor 220 (or independent processor of interfaces 210) to perform functions relating to the techniques described herein, in conjunction with predictive routing process 248.

Specifically, according to various embodiments, a device forms clusters of network paths via which traffic for an online application is conveyed by applying clustering to time series of quality of experience metrics for the online application. The device calculates, for a particular cluster of network paths among the clusters of network paths, correlation metrics between path features of those network paths of that cluster. The device selects, based on the correlation metrics, a particular path feature from among the path features as a root cause of poor quality of experience metrics for the online application along the network paths of the particular cluster of network paths. The device provides, to a user interface, an indication of the particular path feature as being the root cause of poor quality of experience metrics for the online application.

Figure 5:
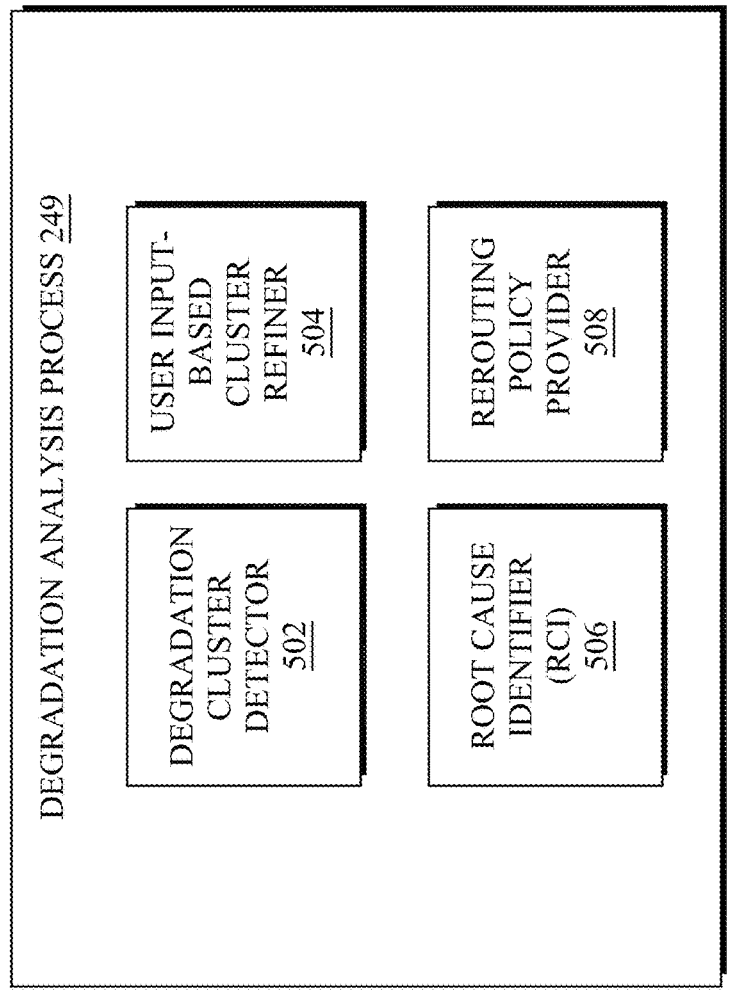
FIG. 5 illustrates an example architecture for application degradation root causing and rerouting using time series clustering.
Figure 6A:
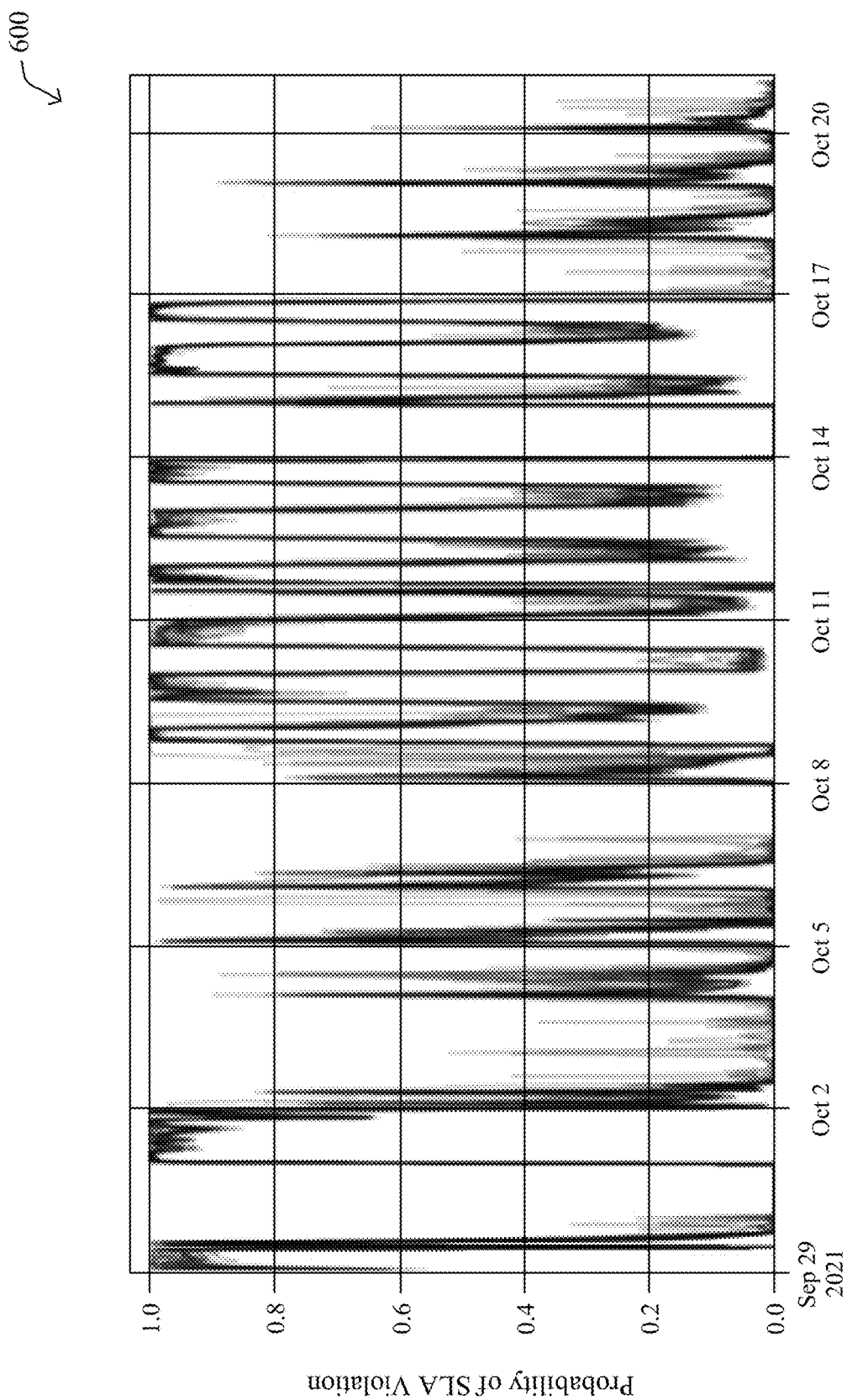
FIGS. 6A-6D illustrate example clusters of time series plots of the probability of service level agreement (SLA) violations.
Figure 6B:
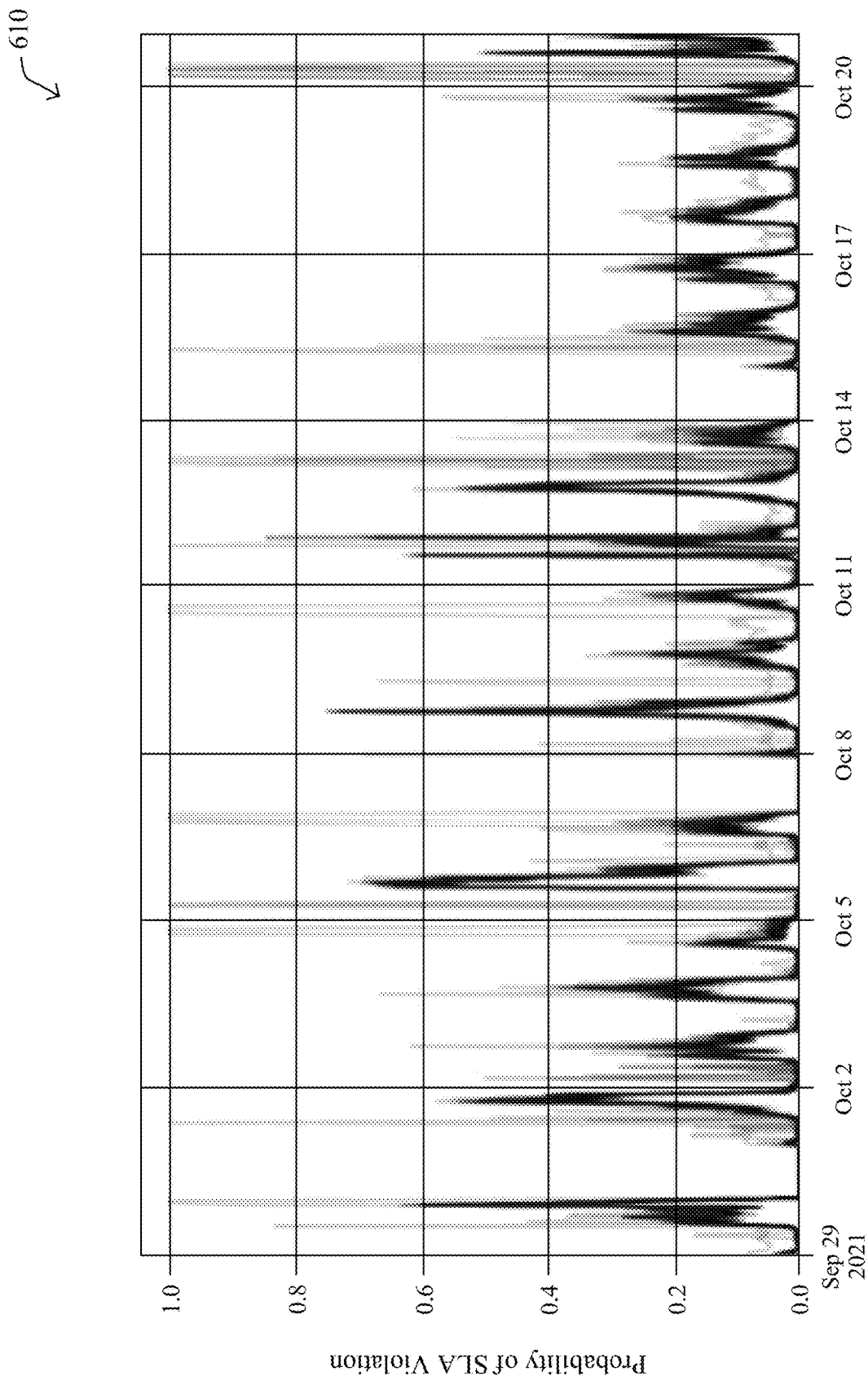
Figure 6C:
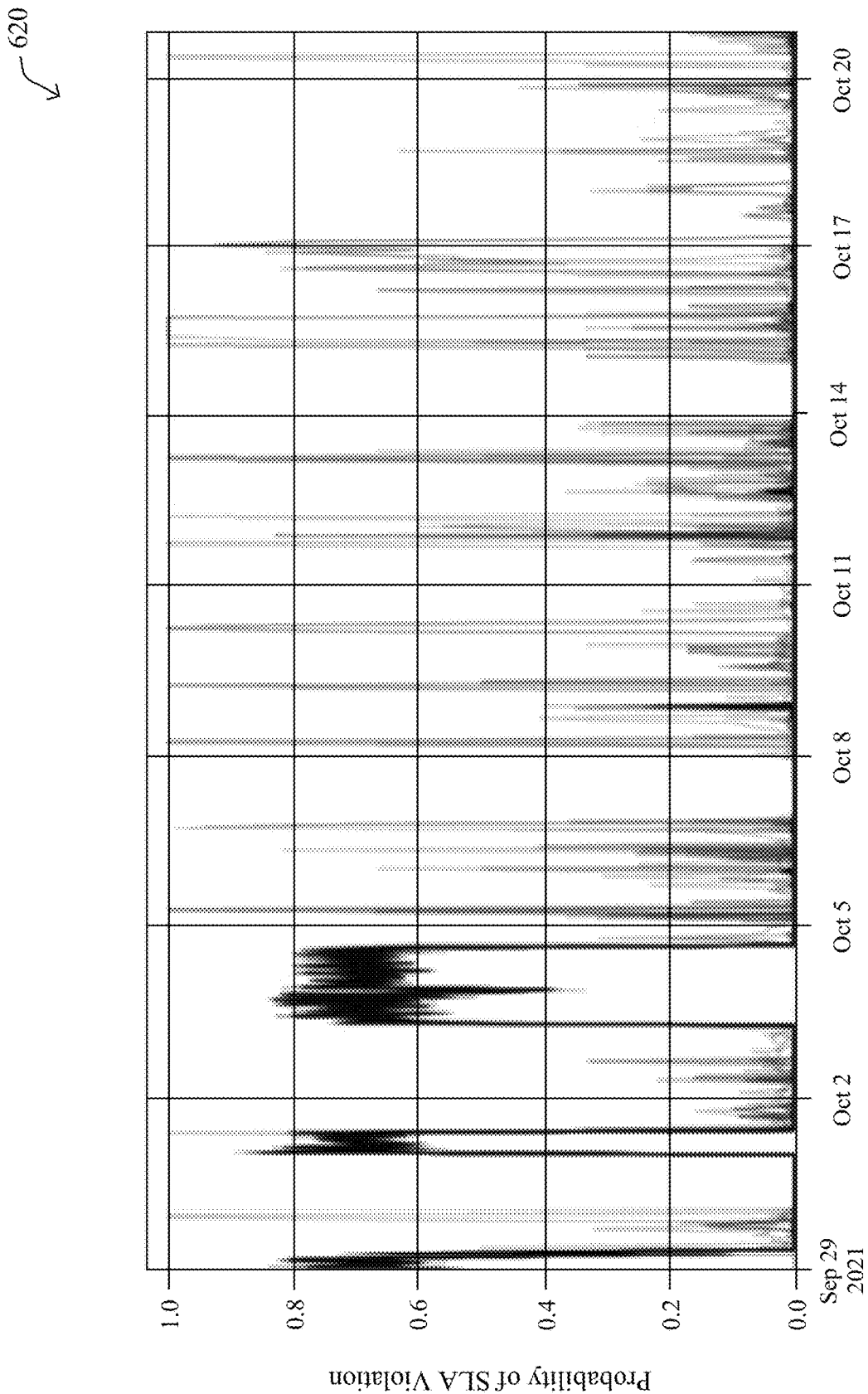
Figure 6D:
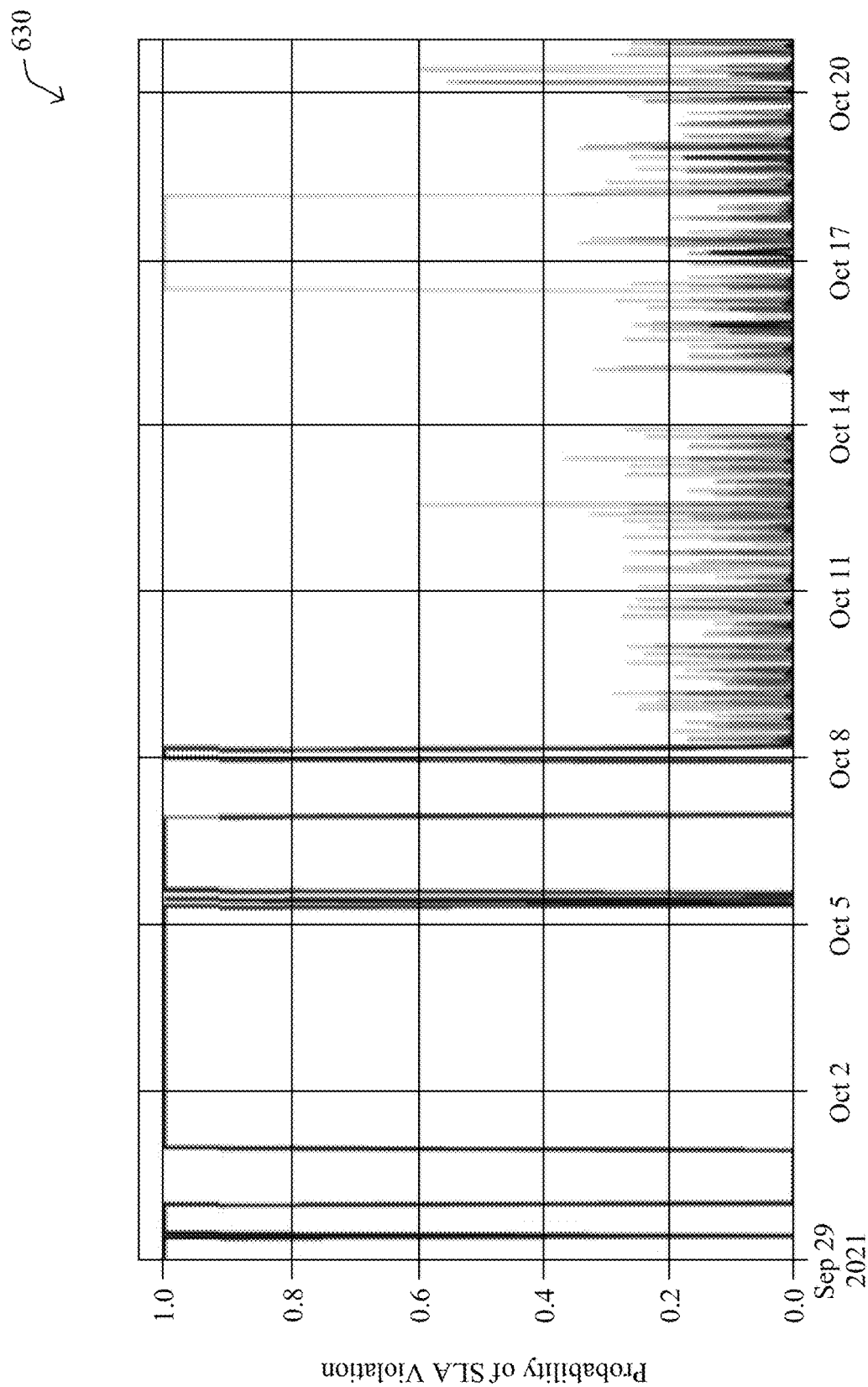

Operationally, FIG. 5 illustrates an example architecture for application degradation root causing and rerouting using time series clustering, according to various embodiments. At the core of architecture 500 is degradation analysis process 249, which may be executed by a controller for a network or another device in communication therewith. For instance, degradation analysis process 249 may be executed by a controller for a network (e.g., SDN controller 408 in FIGS. 4A-4B), a particular networking device in the network (e.g., a router, etc.), another device or service in communication therewith, or the like, to provide a supervisory service to the network. More specifically, degradation analysis process 249 may operate in conjunction with a predictive application aware routing engine, such as predictive application aware routing engine 412, or directed implemented as a component thereof, in some embodiments.

As shown, degradation analysis process 249 may include any or all of the following components: a degradation cluster detector 502, a user input-based cluster refiner 504, a root cause identifier (RCI) 506, and/or a rerouting policy provider 508. As would be appreciated, the functionalities of these components may be combined or omitted, as desired. In addition, these components may be implemented on a singular device or in a distributed manner, in which case the combination of executing devices can be viewed as their own singular device for purposes of executing degradation analysis process 249.

In some embodiments, degradation analysis process 249 may operate in conjunction with the mechanisms described previously with respect to predictive application aware routing engine 412. For instance, degradation analysis process 249 may interface with predictive routing process 248 to leverage its datalake of measurements from the network paths and/or online application. In addition, degradation analysis process 249 may also receive information regarding the predictions and/or actions triggered by predictive routing process 248. For example, degradation analysis process 249 may obtain tunnel health metrics from different probes (e.g., BFD probes) that indicates various path metrics such as loss, latency, and jitter on all tunnels. In addition, degradation analysis process 249 may also obtain the NetFlow data that describe the application usage. If available, degradation analysis process 249 may also obtain application feedback data from users regarding their satisfaction with the application, either directly or as captured by the application. The application feedback can be a continuous number or a discrete value (e.g., 'good,' 'degraded,' 'bad,' or 'no opinion,' etc.). In other cases, degradation analysis process 249 may obtain multiple such application feedback metrics.

During execution, degradation cluster detector 502 may be responsible for utilizing the time series of QoE metrics indicative of application experience degradation, and clustering the network paths that have similar patterns of application experience. In one embodiment, these time series may take the form of the time series of probability of SLA violation for a given application, such as those predicted by predictive routing process 248. For example, the probability of an SLA violation for an application A at time period t for a given path P can be defined as the fraction of time within the time period t where it violates the SLA thresholds of the application for loss, latency, and/or jitter. In other words, the probability of SLA violations can be used as a proxy for the QoE of the application. Of course, an alternative time series can also be constructed based on user feedback regarding the application, if such information is available.

In various embodiments, degradation cluster detector 502 may apply a time series clustering algorithm, such as Uniform Manifold Approximation and Projection (UMAP) or k-Shape, to find the cluster of network paths having time series where the pattern of application degradation is similar. Since a goal of the techniques herein is to determine the root cause of application degradation, degradation cluster detector 502 may also apply some form of filtering, to reduce the set of network paths under consideration only to those whose time series exhibit at least some form of application degradation. This can be done, for instance, by computing the mean degradation, standard deviation, or entropy of the time series, and removing those time series that do not have many instances of degradations.

FIGS. 6A-6D illustrate example clusters of time series plots 600-630 of the probability of service level agreement (SLA) violations. More specifically, FIGS. 6A-6D show four clusters of probability of SLA violation (probSlaV) for voice application, as captured by a prototype system implementing the techniques herein. Each cluster for probSlaV is referred to herein as "probSlaV cluster," for simplicity.

Each line in FIGS. 6A-6D shows the probSlaV for one path. The darker parts of the line represent multiple network paths having same probSlaV. The clustering by degradation cluster detector 502 will automatically group paths that have similar patterns. In some instances, degradation cluster detector 502 may score each probSlaV based on how similar their time series are. Several metrics such as Silhouette score can be used to rank the 'goodness' of the cluster. These probSlaV clusters and the ranking of the clusters are stored back into the datalake.

Referring again to FIG. 5, user input-based cluster refiner 504 may be responsible for seeking user input regarding the clusters formed by degradation cluster detector 502, in various embodiments. For instance, user input-based cluster refiner 504 may present data regarding the clusters for review. In one embodiment, user input-based cluster refiner 504 may present the 'top' clusters formed by degradation cluster detector 502. In turn, the user may opt to take any number actions regarding the clusters which may include opting to merge two or more clusters that appear to be similar, selecting a cluster for exclusion during root causing, splitting a cluster into multiple clusters (and assigning them new cluster IDs), or the like. To aid in this, user input-based cluster refiner 504 may also present additional contextual data, as well. For instance, user input-based cluster refiner 504 may also indicate what is common between those clusters (e.g., x % of the network paths of cluster A and B share the same SP, etc.), which can aid in the user's decision to merge the clusters or not.

Figure 7A:
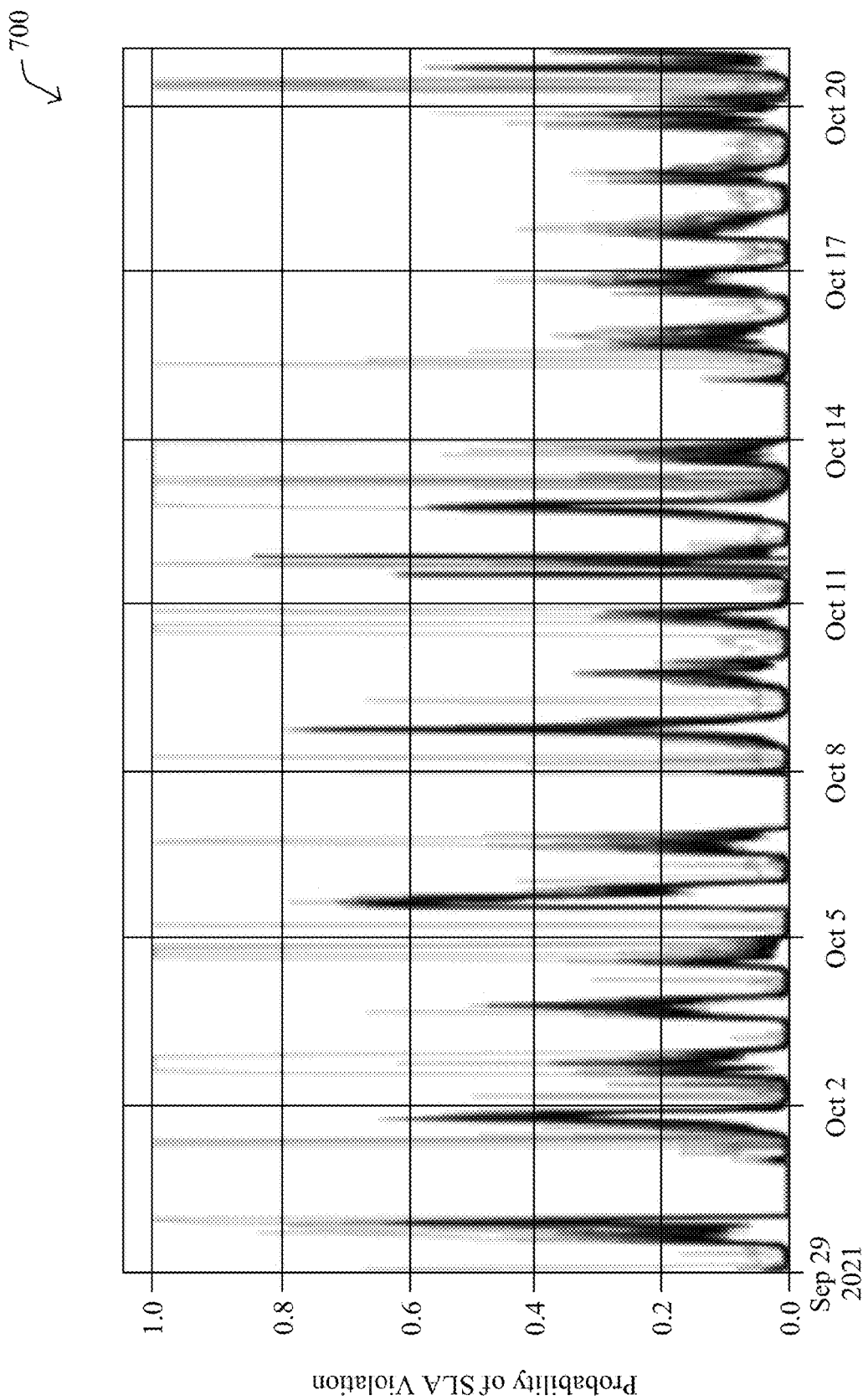
FIGS. 7A-7B illustrates example plots of SLA violation clusters.
Figure 7B:
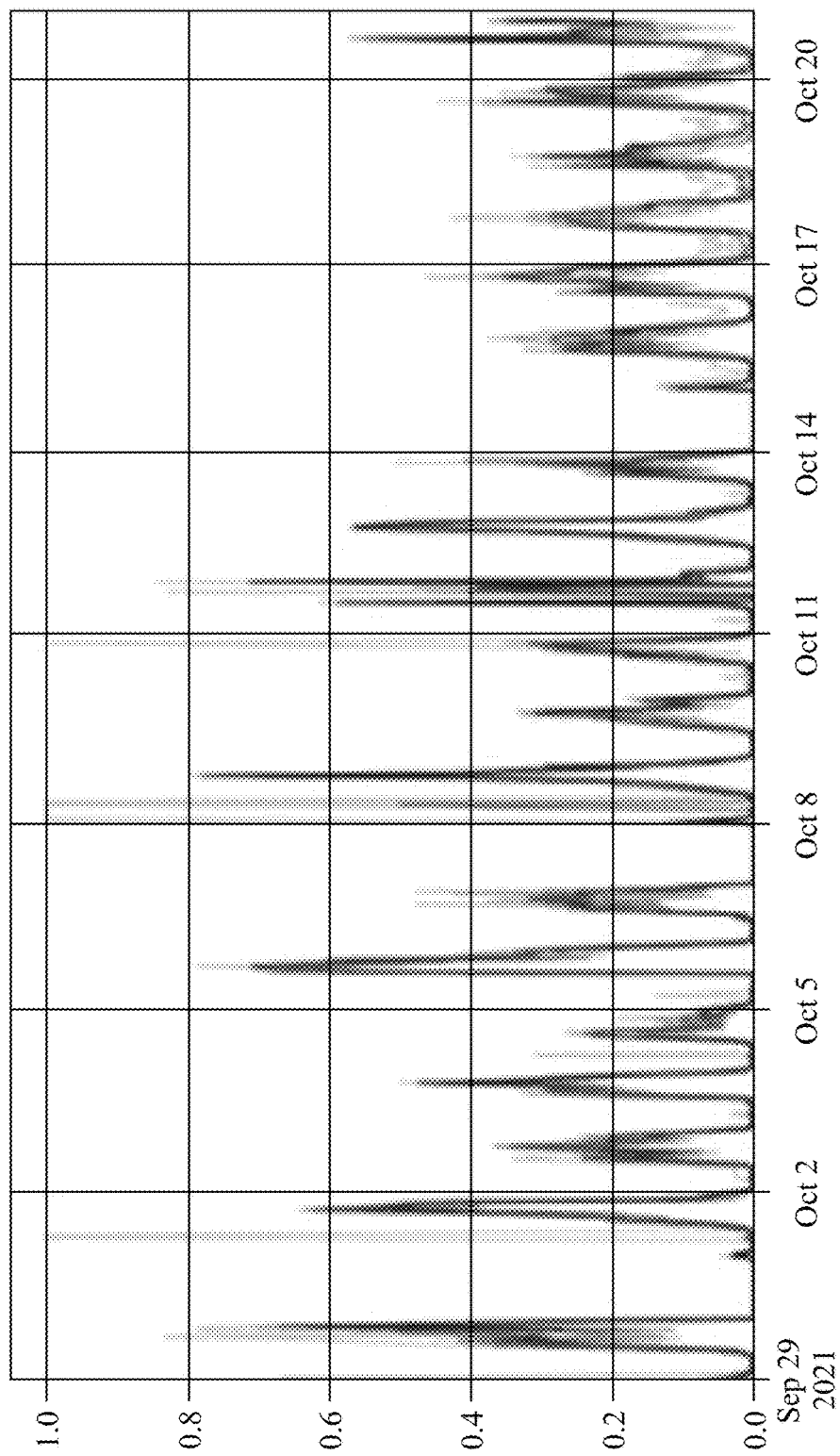

FIGS. 7A-7B illustrates example plots of SLA violation clusters 700-710 that may be presented for display by user input-based cluster refiner 504. These clusters were formed by a prototype system implementing the techniques herein and based on real network data and for paths sharing the same site-name and transport type (e.g., business Internet). As would be appreciated, both clusters are fairly similar in their patterns. In such a case, the user may opt to merge the two clusters for purposes of determining the root cause of their behaviors. Of course, the system may also support merging n-number of clusters, based on user input, as well.

Referring again to FIG. 5, RCI 506 may be responsible for finding the root cause for the application behavior patterns seen in the each of the clusters, in various embodiments. To do so, RCI 506 may obtain the various features of the network paths associated with the clusters. In some embodiments, these features may include those that can be used by RCI 506 (or a data provider for RCI 506) to form various time series. For instance, example time series features for the network paths may include, but are not limited to, characteristics of a particular networking device or set of devices along a network path (e.g., head/tail routers), such as its CPU/processor utilization over time, its memory utilization over time, its traffic load over time, its queue length over time, etc.

In further embodiments, the features of the network paths of a cluster may include non-time series features that are more static in nature and not time-variant. Examples of such path features may include, but are not limited to, site names, service providers (SPs), autonomous systems (ASs), points of presence (POPs), tunnel transport types (e.g., MPLS, Internet, business Internet, etc.), and the like.

For each individual feature, RCI 506 may apply one or more correlation or root causing algorithms, to find out whether the degradation patterns occur in each of the individual features. For example, in one embodiment RCI 506 may construct the variation of non-time series features, such as site and tunnel transport, for a given probSlaV cluster CprobSlaV. The algorithm may construct a histogram of how many paths have different values of a given value of a feature. As an example, it may infer 95% of the network paths have the same site-name in CprobSlaV.

In turn, RCI 506 may assign a correlation score for this site-name (e.g., 95%). RCI 506 may also rank the histograms for different non-timeseries features by taking the maximum count or fraction of paths that are assigned to a given value. For example, if one feature F1 (e.g., site-name) has 95% of the network paths to a site S1, then the correlation score $S(F1, CprobSlaV)=95\%$. Each feature Fi can then be ranked in descending order of the correlation score. In one embodiment, RCI 506 may present this ranked set of features for review by an expert user as a strong correlation factor. This can help the expert to narrow things down by inferring that multiple (possibly 100s of) paths that originate in site S1 have violations as seen in the cluster.

Figure 8:
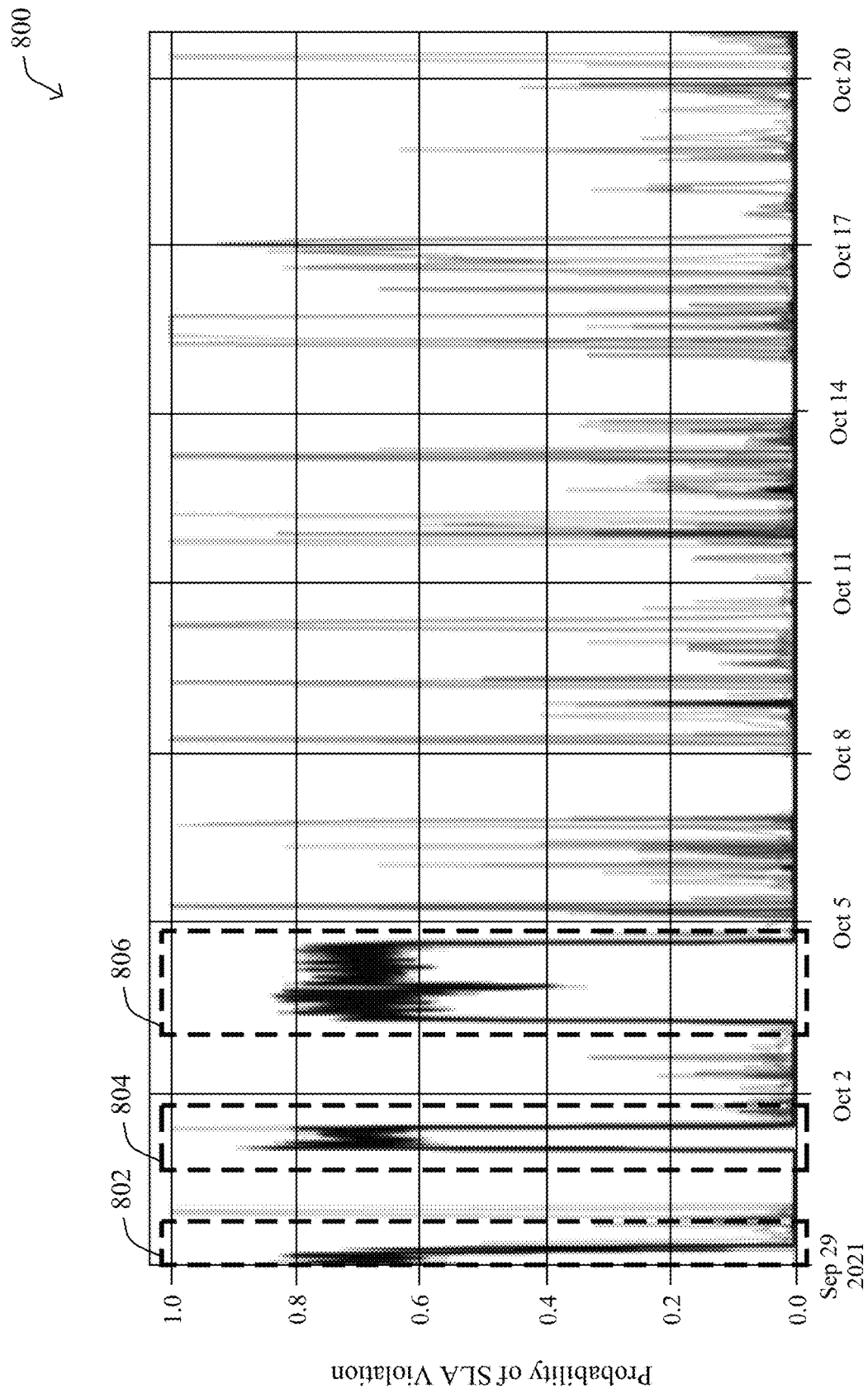
FIG. 8 illustrates an example of regions of a cluster of time series exhibiting strong similarities.

In other embodiments, RCI 506 may leverage more complex algorithms to infer the causality of such spikes. For example, RCI 506 may first consider all paths in each probSlaV cluster $CprobSlaV=\{P_1, P_2, \ldots, P_n\}$. The algorithm may automatically mark the time series regions where there is strong similarity among all the network paths. For instance, FIG. 8 illustrates an example of regions 802-806 of a cluster 800 of time series exhibiting strong similarities. Such regions 802-806 are called strong similarity regions for CprobSlaV. In another embodiment, RCI 506 may present cluster 800 for display to a user via a user interface, thereby allowing the user to mark any or all of regions 802-806 via the user interface.

In the second step, for each time series feature F1 (e.g., CPU at head router), RCI 506 may use similar time series clustering algorithm to identify the feature cluster CF1 for all paths in CprobSlaV. In turn, RCI 506 may then compute the cluster strength by a.) running the time series clustering algorithm with k=1 cluster, and removing the outliers, and b.) measuring the Silhoutte score of the network paths that are clustered in that one cluster. If the cluster strength is above a given threshold, then RCI 506 may compare the clusters CF1 and CprobSlaV. For example, the algorithm may construct strong similarity regions for CF1, similar to the one performed for CprobSlaV above. If there is an overlap in strong similarity regions, then the feature F1 can be possibly correlated with the application degradation observed in CprobSlaV. A correlation score can then be assigned by RCI 506 (e.g., a percentage of time that the strong similarity region CF1 and CprobSlaV overlap) for feature F1. As above, then the features can be sorted by scores, and the strongly correlated features could also be reported to a user via a user interface by RCI 506.

In yet another embodiment, RCI 506 may apply one or more root causing algorithms, to identify the feature(s) that are the root cause of the degradation in the application experience. For example, a representative time series for CprobSlaV (RprobSlaV) may be taken by constructing the mean or median of the time series. Similarity, RCI 506 ay construct a representative time series for each time series feature F1 (RF1) for CF1. RCI 506 may then apply a root causing algorithm, such as Granger Causality. For example, the algorithm may first try to forecast the RprobSlaV as a univariate forecasting problem, and will measure the accuracy of forecasting using many metrics such as Mean Absolute Scaled Error (MASE) or Mean Absolute Percentage Error (MAPE). It will then add the RF1 as an exogenous variable, and then predict RprobSlaV. If there is a significant positive difference in the accuracy of the latter than the former model, then it will conclude that F1 may be the cause for the cluster CprobSlaV.

In various embodiments, RCI 506 may then present the identified feature(s) as possible root causes to a user interface for review by an expert user. For example, RCI 506 may show the top probSlaV clusters and, for each probSlaV cluster, also show the ranked features that are highly correlated or suspected to be the cause of the degraded application experience.

Rerouting policy provider 508 may be responsible for creating a policy to avoid the network paths in the degradation cluster. In one embodiment, rerouting policy provider 508 may select those clusters CprobSlaV that exhibit significant application degradation (e.g., exceeding a certain threshold and/or for a certain amount of time). For a given CprobSlaV, the cause for the degradation is also determined by RCI 506. For example, if a given site name and transport (say, site S1 with biz-internet transport) have high correlation scores for a given cluster, rerouting policy provider 508 may enforce a policy is enforced not to choose the alternate path which have the same site name and transport.

In various embodiments, predictive application aware routing engine 412 may then operate in conjunction with rerouting policy provider 508 to select an alternate routing path or paths with different values/features. For instance, site S1 with MPLS for the tunnel transport may be selected as an alternate for paths with S1 and business Internet as their transport, if the alternate does not have the same application degradation patterns.

In other embodiments, rerouting policy provider 508 may determine, for each path Pprimary in one cluster CprobSlaV, a set of alternative paths {Psec1, Psec2, . . . }. These alternate paths may also be checked to ensure that a.) they do not belong to the same cluster as Pprimary, since it can have correlated degradation at the same time, and b.) they do not to have the same detrimental effects during similar times as that of Pprimary. If an alternative route violates any of the above condition, it can be added to a block-list for the given Pprimary. The routing protocol or engine (e.g., engine 412) can then make sure that the application traffic is not routed in the alternative paths that are there in the block-list. In yet another embodiment, rerouting policy provider 508 may check that, by moving to another cluster, there is no longer high correlation with the other paths experiencing application issues.

Figure 9:
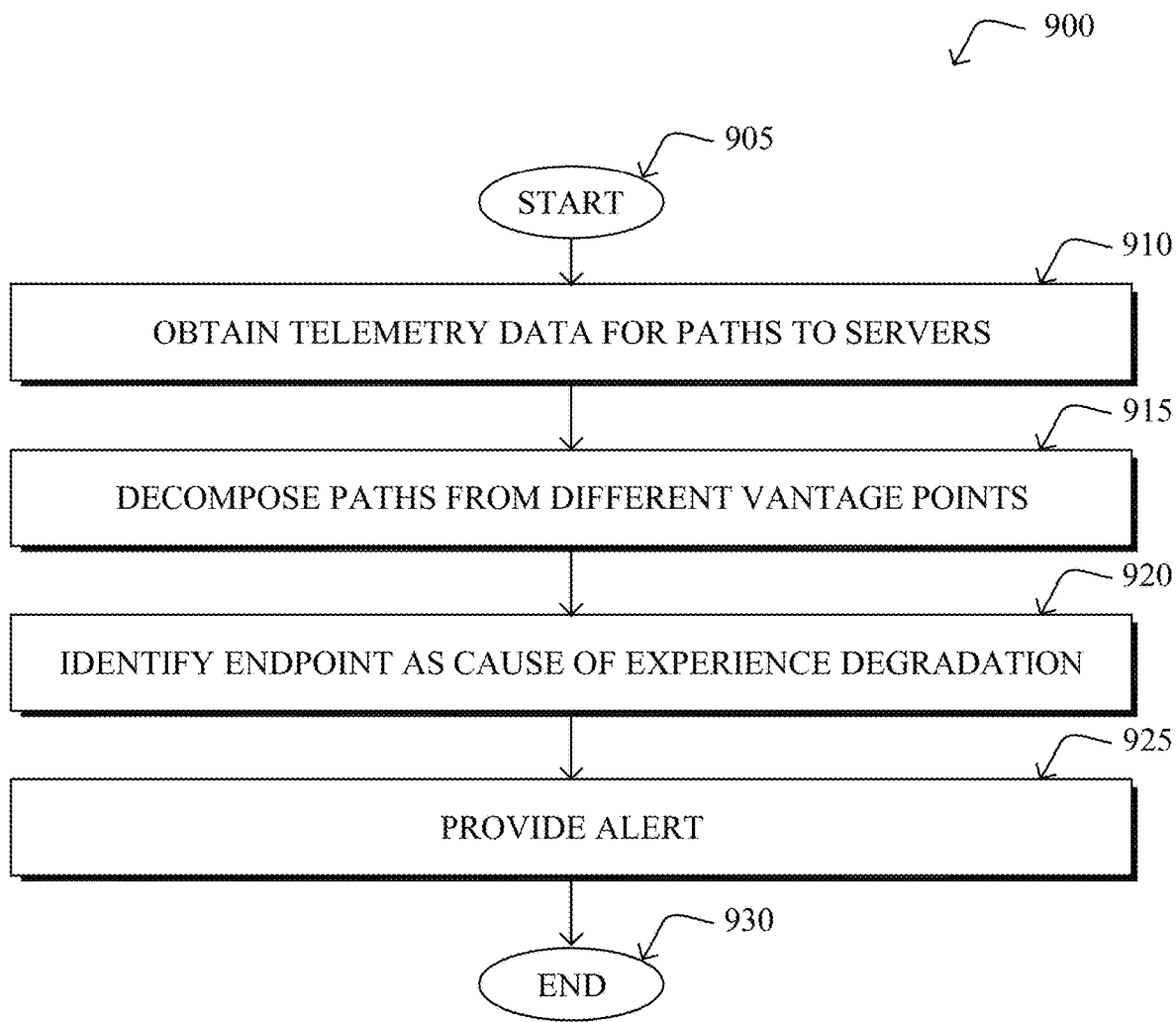
FIG. 9 illustrates an example simplified procedure for application degradation root causing and rerouting using time series clustering.

FIG. 9 illustrates an example simplified procedure 900 (e.g., a method) procedure for application degradation root causing and rerouting using time series clustering, in accordance with one or more embodiments described herein. For example, a non-generic, specifically configured device (e.g., device 200), such as controller for a network (e.g., an SDN controller or other device in communication therewith), a networking device, etc., may perform procedure 900 by executing stored instructions (e.g., degradation analysis process 249). The procedure 900 may start at step 905, and continues to step 910, where, as described in greater detail above, the device may form clusters of network paths via which traffic for an online application is conveyed by applying clustering to time series of quality of experience metrics for the online application. In one embodiment, the quality of experience metrics for the online application comprise probabilities of failure conditions predicted by a machine learning model. In another embodiment, the quality of experience metrics are based on user feedback provided to the online application. In one embodiment, the network paths may be paths in a software defined network (SDN), such as an SD-WAN or the like.

At step 915, as detailed above, the device may calculate, for a particular cluster of network paths among the clusters of network paths, correlation metrics between path features of those network paths of that cluster. In some embodiments, the device may provide, to a user interface, data regarding the clusters of network paths. In turn, the device may merge two or more of the clusters of network paths into the particular cluster of network paths, based on an instruction to do so from the user interface, after providing the data regarding the clusters of network paths to the user interface. In a further embodiment, the device may make the calculation in part by receiving, at the device and from a user interface, indications of regions of strong similarity among time series of the particular cluster of network paths.

At step 920, the device may select, based on the correlation metrics, a particular path feature from among the path features as a root cause of poor quality of experience metrics for the online application along the network paths of the particular cluster of network paths, as described in greater detail above. In some embodiments, the path features comprise non-time series features including at least one of: a site, a service provider, or a type of tunnel transport. In further embodiments, the path features comprise a plurality of time series features including at least one of: a processor utilization over time, a memory utilization over time, a traffic load over time, or a queue length over time. In one embodiment, the device may also calculate the correlation metrics in part by applying clustering to the plurality of time series features.

At step 925, as detailed above, the device may provide, to a user interface, an indication of the particular path feature as being the root cause of poor quality of experience metrics for the online application. In some embodiments, the device may also cause at least a portion of the traffic for the online application to be rerouted, based on the root cause of poor quality of experience metrics for the online application. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the identification of the root causes of a degradation in the quality of experience (QoE) of an online application, such as a software-as-a-service (SaaS) application. In some aspects, a user-interactive approach is introduced that allows a user to review clusters of time series for the different paths via which traffic for the application is conveyed. In turn, the root cause of any QoE degradation along those paths may be identified and corrective measures taken, such as rerouting the application traffic during specific times.

While there have been shown and described illustrative embodiments that provide for application degradation root causing and rerouting using time series clustering, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   forming, by a device, clusters of network paths via which traffic for an online application is conveyed by applying clustering to time series of quality of experience metrics for the online application;
   providing, by the device and to a user interface, the clusters of network paths as one or more time series plots, each comprising an indication of a commonality among the clusters of network paths;
   merging, by the device, two or more of the clusters of network paths into a particular cluster of network paths based on an instruction to do so from the user interface;
   calculating, by the device and for the particular cluster of network paths among the clusters of network paths, correlation metrics between path features of those network paths of the particular cluster of network paths, wherein the path features comprise a plurality of time series features including at least one of: a processor utilization over time, a memory utilization over time, a traffic load over time, or a queue length over time;
   selecting, by the device and based on the correlation metrics, a particular path feature from among the path features as a root cause of poor quality of experience metrics for the online application along the network paths of the particular cluster of network paths, wherein the particular path feature is a non-time series feature comprising a site, a service provider, or a type of tunnel transport; and
   providing, by the device and to a user interface, an indication of the particular path feature as being the root cause of poor quality of experience metrics for the online application.

2. The method as in claim 1, wherein the quality of experience metrics for the online application comprise probabilities of failure conditions predicted by a machine learning model.

3. The method as in claim 1, wherein the quality of experience metrics are based on user feedback provided to the online application.

4. The method as in claim 1, wherein calculating the correlation metrics comprises:
   receiving, at the device and from the user interface, indications of regions of strong similarity among time series of the particular cluster of network paths.

5. The method as in claim 1, further comprising:
   causing, by the device, at least a portion of the traffic for the online application to be rerouted, based on the root cause of poor quality of experience metrics for the online application.

6. The method as in claim 1, wherein calculating the correlation metrics comprises:
   applying clustering to the plurality of time series features.

7. The method as in claim 1, wherein the network paths are in a software defined network.

8. An apparatus, comprising:
   one or more network interfaces;
   a processor coupled to the one or more network interfaces and configured to execute one or more processes; and
   a memory configured to store a process that is executable by the processor, the process when executed configured to:
      form clusters of network paths via which traffic for an online application is conveyed by applying clustering to time series of quality of experience metrics for the online application;
      provide, to a user interface, the clusters of network paths as one or more time series plots, each comprising an indication of a commonality among the clusters of network paths;
      merge two or more of the clusters of network paths into a particular cluster of network paths based on an instruction to do so from the user interface;
      calculate, for the particular cluster of network paths, correlation metrics between path features of those network paths of the particular cluster of network paths, wherein the path features comprise a plurality of time series features including at least one of: a processor utilization over time, a memory utilization over time, a traffic load over time, or a queue length over time;
      select, based on the correlation metrics, a particular path feature from among the path features as a root cause of poor quality of experience metrics for the online application along the network paths of the particular cluster of network paths, wherein the particular path feature is a non-time series feature comprising a site, a service provider, or a type of tunnel transport; and
      provide, to a user interface, an indication of the particular path feature as being the root cause of poor quality of experience metrics for the online application.

9. The apparatus as in claim 8, wherein the quality of experience metrics for the online application comprise probabilities of failure conditions predicted by a machine learning model.

10. The apparatus as in claim 8, wherein the quality of experience metrics are based on user feedback provided to the online application.

11. The apparatus as in claim 8, wherein the apparatus calculates the correlation metrics by:
receiving, from the user interface, indications of regions of strong similarity among time series of the particular cluster of network paths.

12. The apparatus as in claim 8, wherein the process when executed is further configured to:
cause at least a portion of the traffic for the online application to be rerouted, based on the root cause of poor quality of experience metrics for the online application.

13. The apparatus as in claim 8, wherein calculating the correlation metrics comprises:
applying clustering to the plurality of time series features.

14. A tangible, non-transitory, computer-readable medium storing program instructions that cause a device to execute a process comprising:
forming, by the device, clusters of network paths via which traffic for an online application is conveyed by applying clustering to time series of quality of experience metrics for the online application;
providing, by the device and to a user interface, the clusters of network paths as one or more time series plots, each comprising an indication of a commonality among the clusters of network paths;
merging, by the device, two or more of the clusters of network paths into a particular cluster of network paths based on an instruction to do so from the user interface;
calculating, by the device and for the particular cluster of network paths, correlation metrics between path features of those network paths of the particular cluster of network paths, wherein the path features comprise a plurality of time series features including at least one of: a processor utilization over time, a memory utilization over time, a traffic load over time, or a queue length over time;
selecting, by the device and based on the correlation metrics, a particular path feature from among the path features as a root cause of poor quality of experience metrics for the online application along the network paths of the particular cluster of network paths, wherein the particular path feature is a non-time series feature comprising a site, a service provider, or a type of tunnel transport; and
providing, by the device and to a user interface, an indication of the particular path feature as being the root cause of poor quality of experience metrics for the online application.

* * * * *